United States Patent [19]
Sneddon

[11] Patent Number: 5,385,081
[45] Date of Patent: Jan. 31, 1995

[54] FLUID STORAGE TANK EMPLOYING A SHEAR SEAL

[75] Inventor: Kirk Sneddon, Sayville, N.Y.

[73] Assignee: Arde Incorporated, Norwood, N.J.

[21] Appl. No.: 118,952

[22] Filed: Sep. 9, 1993

[51] Int. Cl.⁶ .......................... F16J 9/00; F02K 9/50; B67D 5/42
[52] U.S. Cl. ..................... 92/192; 92/165 R; 92/169.1; 60/259; 222/386; 277/DIG. 10
[58] Field of Search ............ 92/192, 194, 165 R, 92/169.1; 60/259, 39.48; 222/386, 389; 277/DIG. 10

[56] References Cited

U.S. PATENT DOCUMENTS

| | | |
|---|---|---|
| 3,130,547 | 4/1964 | Nash . |
| 3,138,001 | 6/1964 | Berks et al. . |
| 3,368,751 | 2/1968 | Merril ........................ 92/169.1 X |
| 3,545,343 | 12/1970 | Orbeck .......................... 92/165 |
| 3,680,310 | 8/1972 | Arvidson ......................... 60/39 |
| 3,923,208 | 12/1975 | Bergloff ..................... 92/169.1 X |
| 4,538,749 | 9/1985 | Rosman et al. ............... 222/386.5 |
| 5,042,365 | 8/1991 | Rosman ......................... 92/192 |

Primary Examiner—John T. Kwon
Assistant Examiner—John Ryznic
Attorney, Agent, or Firm—Cohen, Pontani, Lieberman, Pavane

[57] ABSTRACT

A fluid storage tank utilizing a shear seal in which a leak proof static shear seal covers the entire head of the piston of the storage tank requiring only a single fluid tight seam to seal off the fluid storage chamber from the remainder of the storage tank. The shear seal has a circumferential notch located proximate to its outer periphery which permits the shear seal to rupture along a predetermined path. Elastomeric annular seals on the piston provide a dynamic seal to prevent the fluid from leaking while the piston is moving to eject the stored fluid. The head of the piston flattens any protruding portions of the ruptured shear seal against the walls of the storage tank.

20 Claims, 4 Drawing Sheets

FLUID STORAGE TANK EMPLOYING A SHEAR SEAL

FIELD OF THE INVENTION

The present invention relates to a fluid storage tank employing a shear seal to provide a substantially permanent leak proof static seal which can also easily be ruptured during system activation and yet still provide leak protection through use of a dynamic seal. The shear seal assembly of the present invention is particularly useful as a rocket propellant storage tank.

BACKGROUND OF THE INVENTION

One of the main sources of fuel for the engines of rockets and missiles is propellant fuel which is in the form of a liquid. This liquid propellant is typically stored in cylindrical storage tanks located within the body of the rocket or missile. A movable piston is slidably mounted within the storage tank and is used to maintain the pressure of the liquid fuel in the storage chamber of the tank and to forcibly expel the liquid propellant from the tank through an appropriately located orifice under adverse acceleration environments when desired. Another fluid (a liquid, a gas, a gel, a suspension of solids, or a mixture of any one or more of these) is typically used as a pressurant to cause the piston to slide within the tank to pressurize the propellant or, alternatively, to expel the liquid fuel from the tank.

Since the liquid propellant may have to remain in its storage tank for many years before it is used, it is important that the liquid propellant remain within the storage tank and not seep past the piston. Such seepage of liquid propellant from the storage chamber of the rank into other portions of the rocket not only results in propellant being lost and therefore reducing the range of the rocket, but may also result in a risk of premature ignition of the rocket or in damage to other parts of the rocket, as the propellant is typically extremely caustic. Additionally, elastomeric seals are often necessary to provide a dynamic seal for the piston as it moves within the storage tank. However, the materials from which such elastomeric seals are typically made generally degrade when exposed for a substantial length of time to the liquid propellant, thereby jeopardizing proper operation of the piston and the rocket.

One solution to this problem is proposed in U.S. Pat. No. 5,042,365 wherein an annular shear seal is mounted within the storage tank about the outer circumference of the piston so that it also contacts the inner surface of the wall of the storage tank. The annular shear seal is structurally sealed, such as by welding or other bonding means, along its central opening to the outside surface of the piston and along its outer circumference to the inner surface of the wall of the storage tank. The annular shear seal is disclosed as having a notch portion which is positioned on the shear seal between the point where the shear seal contacts the piston and the point where the shear seal contacts the storage tank wall. The shear seal and its two welds block leakage of the propellant before the rocket is activated. When the rocket is to be activated, fluid pressure is applied to the piston, which causes the piston to exert an increasing force to the shear seal until a point when the shear seal ruptures along its notch. When the sear seal ruptures, the piston is free to slide and thereby expel the liquid fuel from the storage chamber of the tank. Although the disclosed shear seal design aids in preventing leakage of the propellant, the design requires at least two separate welds—one between the piston and the shear seal, and the other between the shear seal and the wall of the storage tank. Since the integrity of these two welds is critical to the proper operation of the storage tank, both of the welds must be inspected prior to final assembly of the tanks. The inspection of these two welds is a relatively time consuming and expensive process in view of the fact that they are located within the narrow confines of the storage rank and must be carried out by using X-ray photography.

Additionally, a shear seal typically does not rupture uniformly along its the entire length of its notch due to variations of the notch profile, variations in the depth of the notch, variations in the thickness of the surrounding material, and variations in the metal comprising the shear seal itself. As a result, it may be expected that a notched shear seal as disclosed above will not break uniformly, at exactly the same position, and at the same moment along its entire length. Furthermore, for the elastomeric seals to operate properly (i.e., provide a fluid tight seal while not impinging upon the freedom of movement of the piston), the rupture point of a shear seal cannot be recessed too deeply into the wall of the storage tank because the elastomeric seals will have to pass over the recess in which the shear seal is mounted. As a result, jagged remnants of the shear seal may be expected to remain, protrude, and tear or score the elastomeric annular seals on the piston. Such tears or scoring of the elastomeric seals allow the propellant to leak around the piston when the piston is activated, thereby possibly causing the piston to malfunction. Remnants of the shear seal may also cause the piston to jam so that all of the propellant cannot be expelled.

U.S. Pat. No. 3,545,343 discloses a design which employs only one weld rather than two or more welds, however, this weld is very deep. In this design, a weld is applied from the outside of the storage tank and passes through the entire wall of the storage tank into a recess in the piston. The weld is disclosed to be thin enough so that it will rupture or shear when the piston begins to move. This design poses problems relating to the formation of a uniform deep weld, and to the evaluation of the integrity of the weld because of its depth. In addition, the design does not protect the elastomeric seals on the piston from getting torn or scored by remnants of the weld after the weld has ruptured.

SUMMARY OF THE INVENTION

The present invention relates to a fluid storage tank which utilizes a shear seal which covers the entire piston head and that is attached to the storage chamber of the fluid storage tank by a single shallow weld. The shear seal, which is preferably bonded to the surface of piston, is attached to the inner surface of the wall of the storage tank by a single weld which is located within a recess in the inner surface of the wall of the storage tank. The weld is fluid tight to prevent any leakage of the fluid from the fluid storage chamber to the elastomeric seals of the piston or to other portions of the storage tank beyond the piston. The shear seal has a circumferential notch located proximate to its outer periphery. When the piston is pressurized, it is forced toward the exit end of the storage tank, thereby applying pressure to the stored fluid and to the shear seal. The shear seal ruptures along its circumferential notch, thereby allowing the piston to slide within the fluid storage tank. Elastomeric annular seals prevent the fluid from leaking between the piston and the wall of the storage tank while the piston is moving so that the fluid is forced out of the storage tank through an exit aperture located proximate to the exit end or the storage tank. The head of the piston, in particular a circumferential shoulder on the outer periphery of the head of the piston, flattens against the wall of the fluid storage tank any protruding portions of the ruptured shear seal, including the jagged edge of the remnant of the shear seal that remains attached to the wall of the storage tank. As a result the elastomeric seals are not damaged when the piston slides and remnants of the ruptured shear seal will not cause the piston to jam while it slides within the tank.

The present invention therefore requires only one shallow weld to seal off the fluid storage chamber of the fluid storage tank, thereby reducing the time of assembly of the storage tank, reducing the number of welds that must be inspected for integrity, and reducing the overall cost of manufacture. The present invention also uses the head of the piston to flatten any portions of the ruptured shear seal that may damage the elastomeric seals.

To ensure that the maximum amount of the stored fluid is expelled by the piston and shear seal, preferably the exit end of the storage tank has the same shape as the head of the piston and the central portion of the shear seal. Thus when the end of the storage tank is planar in shape, preferably the head of the piston and the central portion of the shear seal are correspondingly also planar in shape, and when the end of the storage tank is elliptical in shape, preferably the head of the piston and the central portion of the shear seal are correspondingly also in shape.

In an alternative embodiment of the present invention, a conduit tube passes through the piston and shear seal. Such a conduit tube may be used for transporting a fluid (a liquid, a gas, a gel, a suspension of solids, or a mixture of any one or more of these) to or from other fluid storage tanks, and/or for housing wires connected to remotely located sensors and/or controls. In this embodiment, the conduit tube is mounted within an aperture that passes through the piston and the shear seal. Again, the shear seal covers the entire piston head and is attached to the inner surface of the wall of the storage tank by a single weld which, as described above, is located within a recess in the inner surface of the wall of the storage tank. The shear seal has the same circumferential notch located proximate to its outer periphery, and the piston has the same circumferential shoulder on the outer periphery of the piston to flatten any portions of the shear seal remaining when the piston is activated. The shear seal is also attached to the outer surface of the conduit tube in the same manner that the shear seal is attached to the inner surface of the storage tank. Thus, the shear seal is attached to the outer surface of the conduit tube by a single weld which is located within a recess in the outer surface of the conduit tube. This portion of the shear seal also has a circumferential notch located proximate to the point where the shear seal is attached to the conduit tube. The end of the piston proximate to the aperture through which the conduit tube passes has a circumferential shoulder on its inner periphery to flatten against the conduit tube any portions of the shear seal remaining when the piston is activated.

The fluid storage tank of the present invention is therefore particularly suited for storing liquid propellants in a rocket for long periods of time.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

DETAILED DESCRIPTION OF THE PREFERRED EMBODIMENTS

Figure 1:
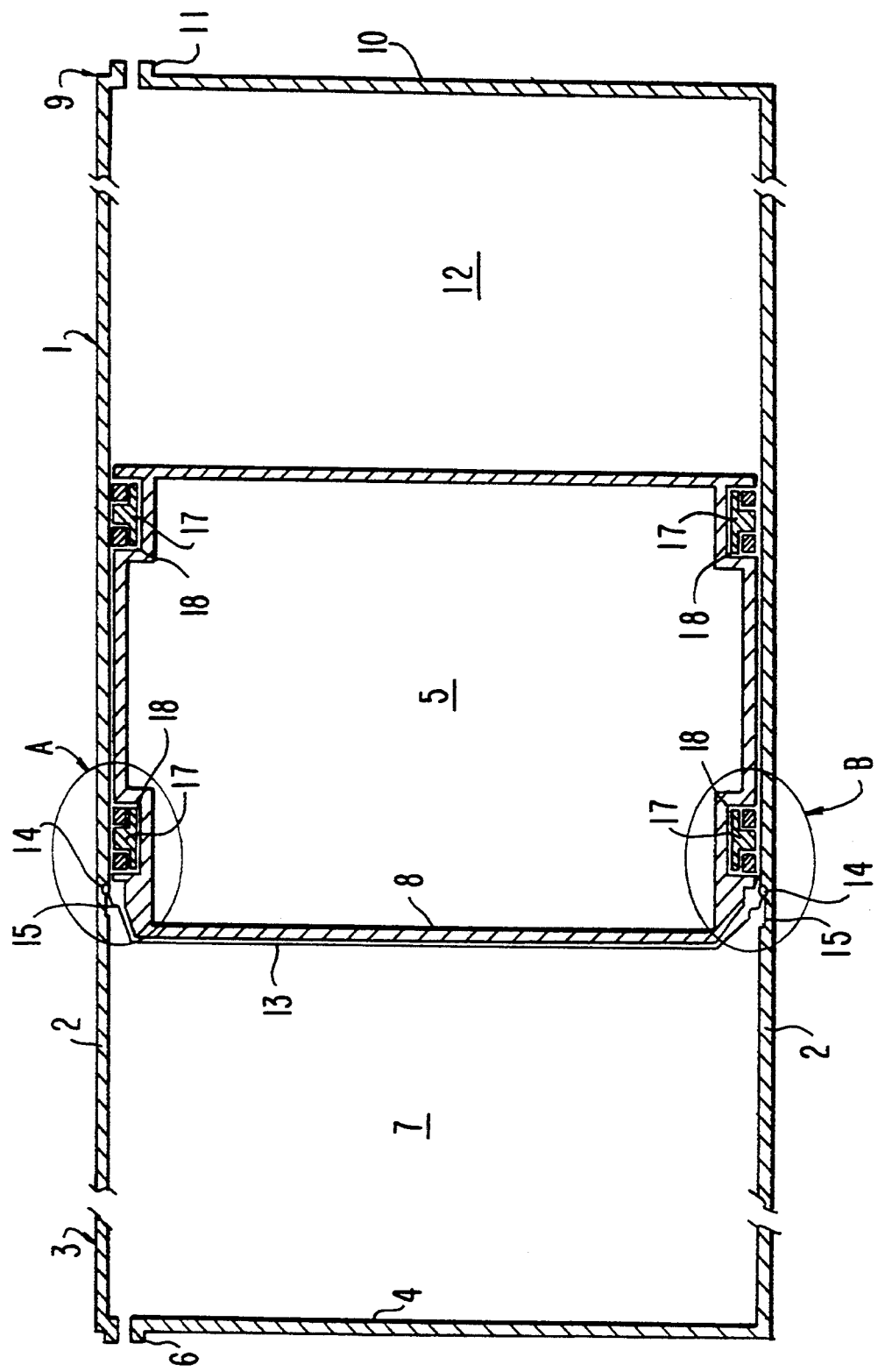
FIG. 1 is a schematic cross-sectional view of a propellant storage tank employing the shear seal of the present invention and wherein the end of the piston is planar in shape.
Figure 2:
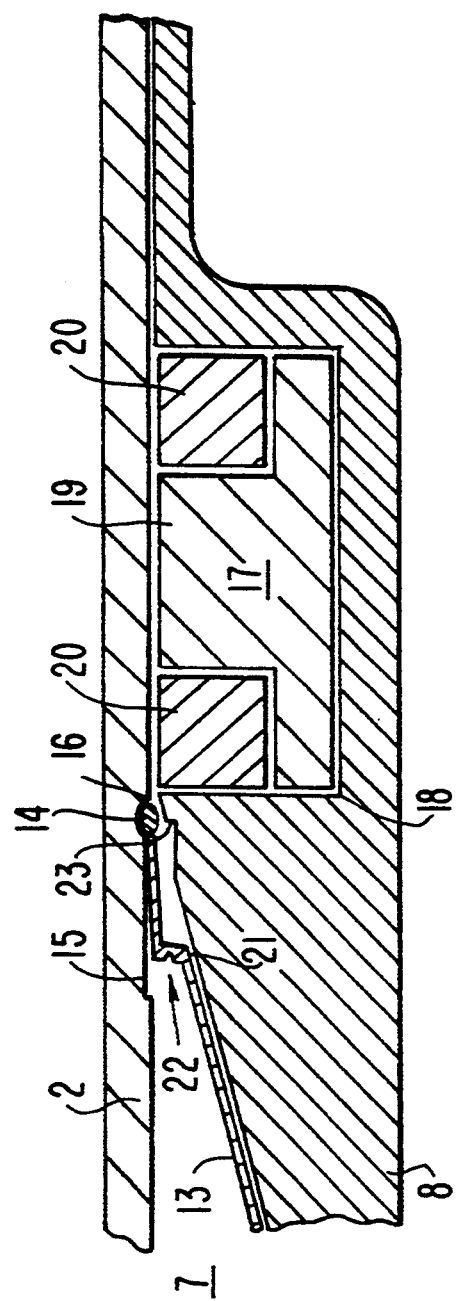
FIG. 2 is a detailed cross-sectional view of the portion of the shear seal of the present invention depicted within circle A in FIG. 1.

Referring to FIGS. 1 and 2, the fluid storage tank 1 of the present invention is generally cylindrical in shape, has an outer wall 2 and is made of a rigid material, such as, for example, aluminum or stainless steel, that is not corroded over a period of years by the fluid to be stored. The exit end 3 of storage tank 1 is sealed by an exit endpiece 4 that is also made of rigid, non-corrosive material and, in the present embodiment, is substantially planar in shape. An outlet tube 6 is mounted in exit endpiece 4. A piston 5 is slidably mounted within storage tank 1. In the present embodiment, the central portion of the head 8 of piston 5 is substantially planar in shape to match the shape of exit endpiece 4. Although piston 5 has an overall cylindrical shape, the outer periphery of piston 5 proximate to piston head 8 is preferably tapered so that the diameter of piston 5 decreases slightly at piston head 8.

The inlet end 9 of storage tank 1 is sealed by an inlet endpiece 10 which is made of a rigid, non-corrosive material and in which is mounted an inlet tube 11. Pressurant chamber 12 is formed within storage tank 1 by piston 5 and inlet end piece 10.

A shear seal 13 is mounted within outer wall 2 of storage tank 1 between piston head 8 and exit endpiece 4 to form a fluid tight storage chamber 7. The fluid to be stored, such as rocket propellant, is stored within fluid storage chamber 7. Shear seal 13 is thin and is made of a rigid, non-corrosive, soft metal, such as aluminum and is attached by a circumferential weld 14 to the inner surface of outer wall 2 of storage tank 1. The attachment of shear seal 13 is made in weld recess 16 of wall recess 15 formed along the entire inner circumference of outer wall 2. Circumferential weld 14, which may be applied by Tungsten Arc Gas Welding (TAGN), is of a size so that it does not protrude beyond wall recess 15. Although shear seal 13 is preferably attached to outer wall 2 by a weld, other means of attachment may be used, provided that the material comprising the attachment means does not corrode upon prolonged exposure to the fluid being stored, provided that it is impervious to the fluid, and provided that its structural integrity is greater than that of the shear seal 13 at its circumferential notch 22 (discussed below). The shape of the central portion of shear seal 13 preferably matches the shape piston head 8 so that it fits snugly against piston head 8. Thus, when piston head 8 is substantially planar in shape, as shown in FIG. 1, the central portion of shear seal 13 is also substantially planar in shape. Shear seal 13 is also preferably attached by an adhesive to piston head 8. Shear seal 13 thus provides a static seal to fluid storage chamber 7.

Two annular seal assemblies 17 are mounted within two circumferential seal recesses 18 in piston 5. One of the circumferential seal recesses 18 is proximate to piston head 8 and the other is proximate to the end of piston 5 adjacent to pressurant chamber 12. Annular seal assemblies 17 are annular in shape and tightly contact outer wall 2 of storage tank 1 to provide a tight seal between piston 5 and outer wall 2 and to prevent leakage of the fluid from storage chamber 7 past piston 5 after shear seal 13 has ruptured as discussed below. Although annular seal assemblies 17 are shown as being mounted within recesses which prevent movement of the annular seal assemblies 17 when piston 5 moves, annular seal assemblies 17 may alternatively be merely mounted on the outer surface of piston 5. Annular seal assembly 17 is preferably comprised of an annular T-seal 19 and two back-up rings 20. T-seal 19 and back-up rings 20 are both comprised of a material which does not degrade quickly when exposed to the stored fluid. Additionally, T-seal 19 is made of material that remains resilient when exposed for a relatively short period of time to the fluid stored in storage chamber 7. Preferably, T-seal 19 is comprised of a high modular rubber such as, for example, ethylene propylene rubber, while back-up rings 20 are comprised of Teflon, most preferably virgin Teflon.

Shear seal 13 has a shoulder 21 proximate to its outer periphery into which is cut a circumferential notch 22 which encircles shear seal 13. Circumferential notch 22 is preferably wedge shaped and is of a depth so that shear seal 13 will rupture along circumferential notch 22 as pressure is applied to piston 6, as described below. The outer periphery of shear seal 13 outside of shoulder 21 fits within wall recess 15 which is of a depth so that when inserted into wall recess 15 shear seal 13 does not protrude beyond the inner surface of outer wall 2 of storage tank 1. The length of wall recess 15 is such that the outer periphery of shear seal 13 outside of shoulder 21 fits into wall recess 15 and so that when circumferential notch 22 ruptures any portions of shear seal 13 from its outer periphery to and slightly beyond circumferential notch 22 will also fit into seal recess 22. Around the circumference of piston head 8 is piston shoulder 23 which is positioned so that it is proximate to circumferential notch 22 of shear seal 13. Piston shoulder 23 preferably has the shape of a blunt faced wedge so that its shortest portion is proximate circumferential notch 22 of shear seal 13 while the longest portion is proximate annular seal assembly 17.

Since all of the elements described above appear around the circumference of piston 5, the portion shown of the shear seal of the present invention shown in FIG. 2 also appear identically but in a mirror image within the circle B in FIG. 1.

In operation, fluid is stored in storage chamber 7. A pressurant fluid (a liquid, a gas, a gel, a suspension of solids, or a mixture of any one or more of these) is introduced into storage tank 1 through inlet tube 10. As a result, pressure builds up in pressurant chamber 11 against piston 5 and thus against shear seal 13. The pressure exerted upon shear seal 13 causes it to rupture along circumferential notch 22. The dynamic seal provided by annular seal assembly 17 ensures that the stored fluid does not leak past piston 5 after shear seal 13 has ruptured and while piston 5 is moving. Piston 5 slides within storage tank 1 thereby increases the pressure in storage chamber 7, urging the stored fluid to be expelled from storage tank 1 through outlet tube 6. As piston 5 slides, the head 8 of piston 5, in particular, piston shoulder 23, flattens any portions of shear seal 13 that extend out of wall recess 15, including the jagged edge of the remnant of the shear seal 13. As a result of the length and depth of wall recess 15, all portions of shear seal 13 remaining attached to outer wall 2 by weld 14 are removed from the path of piston 5, thereby preventing annular seal assembly 17 from being damaged. Because piston head 8 and the central portion of shear seal 13 have the same planar shape as endpiece 4 of storage tank 1, when piston 5 has travelled the full length of storage chamber 7, substantially all of the propellant is expelled from storage chamber 7.

Figure 3:
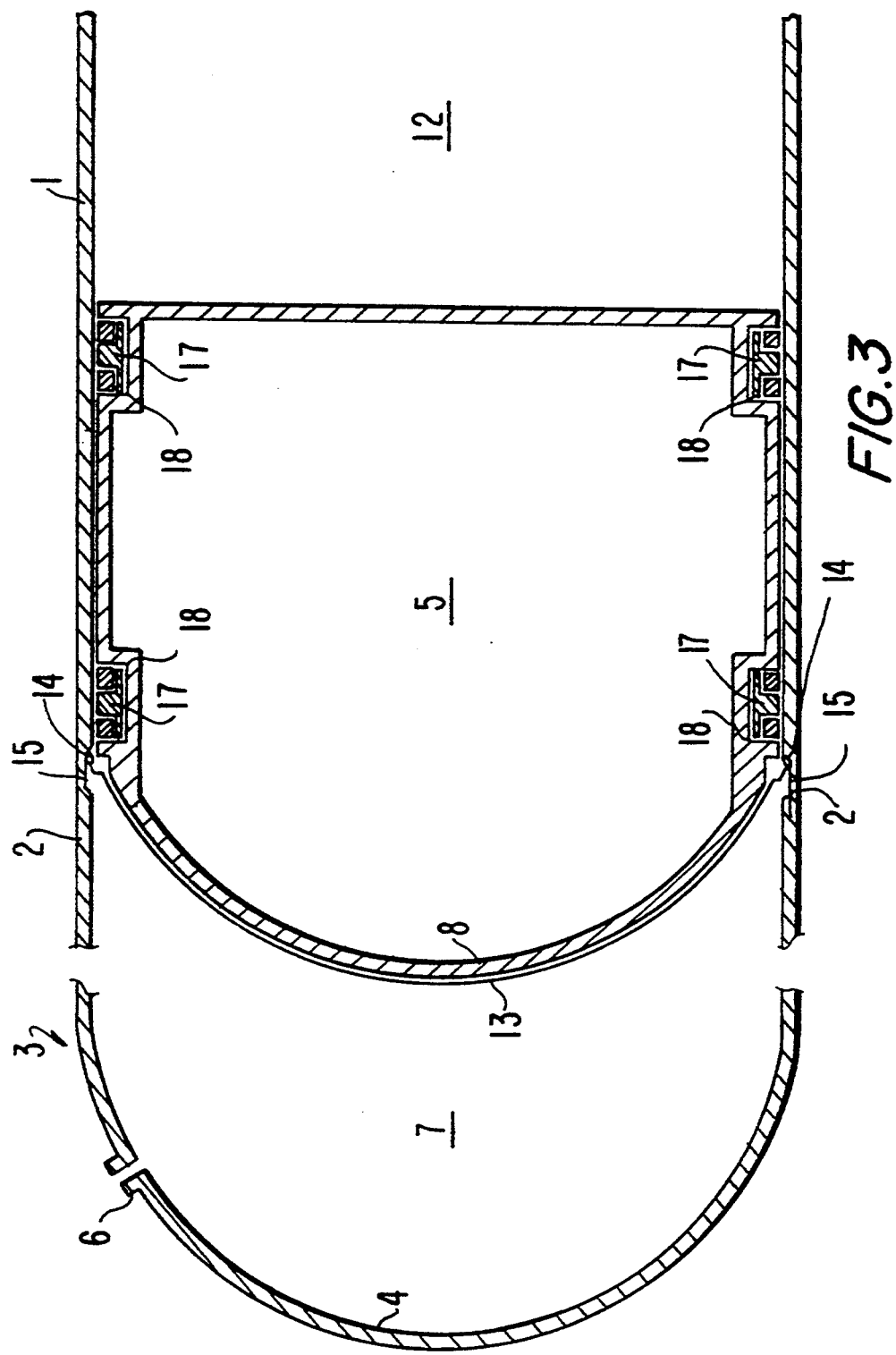
FIG. 3 is a schematic cross-sectional view of an alternative embodiment of the shear seal of the present invention where the end of the piston is elliptical in shape.

FIG. 3 shows an alternative embodiment of the present invention in which all of the elements are identical to those shown in FIGS. 1 and 2 except that piston head 8, the central portion of shear seal 13 and endpiece 4 of storage tank 1 are all generally elliptical in shape.

Figure 4:
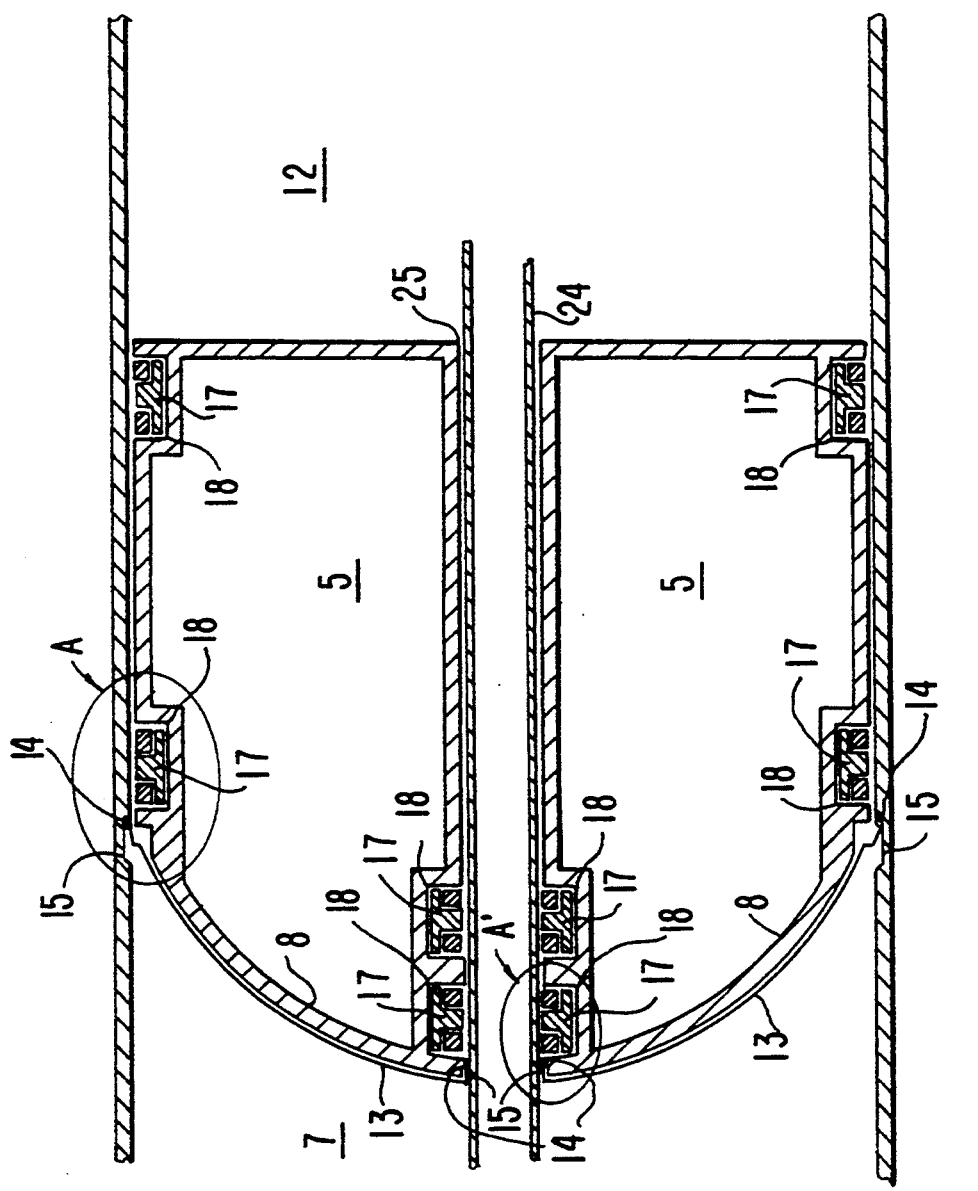
FIG. 4 is a schematic cross-sectional view of an alternative embodiment of the shear seal of the present invention wherein a conduit tube passes through the shear seal and the piston.

FIG. 4 shows an alternative embodiment of the present invention in which a conduit tube 24 passes through piston 5 and shear seal 13. Conduit tube 24 is mounted within an aperture 25 that passes through piston 5 and shear seal 13. Conduit tube 24 may be used for transporting a fluid (a liquid, a gas, a gel, a suspension of solids, or a mixture of any one or more of these) to or from other propellant storage tanks, and/or for housing wires connected to remotely located sensors and/or controls. All of the elements are identical to those shown in FIGS. 1, 2 and 3 except that additional sealing elements are present proximate to aperture 25 in piston 5. However, these elements are identical to those previously described above. In particular, the elements shown in FIG. 2 and within circle A in FIG. 1 are identical to those within circle A' in FIG. 4 except that wall recess 15 and weld recess 16 are present in the exterior wall of conduit tube 24. Thus shear seal 13 has two circumferential notches—one proximate to its outer periphery and another proximate to its central aperture through which conduit tube 24 passes. Similarly, the head 8 of piston 5 is tapered in two places and has two shoulders with which to flatten any portions of extruding shear seal after it has ruptured one proximate to the outer wall 2 of storage tank 1 and another proximate to the wall of conduit tube 24. The operation of the embodiment shown in FIG. 4 is identical to that relating to the embodiment shown in FIG. 1 except that two circumferential notches of the shear seal rupture when piston 5 begins to move and two piston shoulders ensure that no remnants of the ruptured shear seal are protruding to damage the elastomeric seals.

Thus, while there have been shown and described and pointed out fundamental novel features of the invention as applied to preferred embodiments thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto.

For example, the shapes of various components may be changed. Storage tank 1, and thus piston 5 and shear seal 13 may have a cross-sectional shapes other than circular, such as, for example, elliptical, square or rectangular. Additionally, piston head 8, the central portion of shear seal 13 and endpiece 4 of storage tank 1 may be generally hemispherical or have an isotensoidal head profile. Although FIG. 4 shows one conduit tube passing through the piston and the shear seal, more than one conduit tube may be used.

Furthermore, although the invention has been described with reference to rocket propellant tanks, the fluid storage tank of the present invention can be used in connection with various other fluids (liquids, gases or mixtures of both), corrosive or not.

What is claimed is:

1. A cylindrical tank for storing fluid comprising:
   a cylindrical body (2) forming a wall of the tank, said cylindrical body having an inner surface in which is formed a circumferential wall recess (15);
   an exit endpiece (4) fixedly attached to an exit end (3) of said cylindrical body (2) by a fluid tight seal;
   an inlet endpiece (10) fixedly attached to an inlet end (10) of said cylindrical body (2) by a fluid tight seal;
   a piston (5) slidably mounted within said cylindrical body (2) between said exit endpiece (4) and said inlet endpiece (10);
   an annular seal (17) mounted on said piston (5) so that said annular seal (17) tightly contacts the inner surface of said cylindrical body (2) to provide a fluid tight seal between stud piston (5) and said cylindrical body (2); and
   a shear seal member (13) mounted within said cylindrical body (2) between said piston (5) and said exit endpiece (4) and fixedly attached by a fluid tight seal to the inner surface of said cylindrical body (2) within said circumferential wall recess (15), said shear seal member (13) forming a fluid tight storage chamber (7) within said cylindrical body (2) between said shear seal member (13) and said exit endpiece (4) in which to store fluid, said shear seal member (13) having a circumferential notch (22) located proximate to an outer periphery of said shear seal member (13), the circumferential notch (22) reducing the thickness of said shear seal member (13) so that when said piston (5) is pressurized said shear seal member (13) ruptures along said circumferential notch (22).

2. The cylindrical tank of claim 1, wherein said piston (5) has a circumferential piston shoulder (23) positioned proximate to said shear seal member (13) between said shear seal member (13) and said annular seal (17), said piston shoulder (23) extending to approach the inner surface of said cylindrical body (2).

3. The cylindrical tank of claim 2, wherein said piston shoulder (23) is wedge shaped.

4. The cylindrical tank of claim 2, wherein an end of said piston (5) proximate to said shear seal member (13) is tapered.

5. The cylindrical tank of claim 1, wherein said shear seal (13) is fixedly attached to said piston (5).

6. The cylindrical tank of claim 1, wherein said shear seal member (13) is attached to said cylindrical body (2) by a weld.

7. The cylindrical tank of claim 1, wherein a central portion of said shear seal member (13) has the same shape as a central portion of a surface of said piston (5) adjacent to said shear seal member (13).

8. The cylindrical tank of claim 7, wherein the central portion of said shear seal member (13) and the central portion of said piston (5) are substantially planar.

9. The cylindrical tank of claim 7, wherein the central portion of said shear seal member (13) and the central portion of said piston (5) are substantially elliptical.

10. The cylindrical tank of claim 7, wherein the central portion of said shear seal member (13) and the central portion of said piston (5) have substantially isotensoidal head profiles.

11. The cylindrical tank of claim 1, wherein said shear seal member (13) has a circumferential shoulder (21) in which said circumferential notch is located.

12. The cylindrical tank of claim 1, further comprising:
    a conduit tube (24) having an outer surface in which is formed a circumferential tube wall recess (15);
    wherein said piston (5) has an aperture passing therethrough in which said conduit tube (24) is slidably mounted, and wherein said piston (5) further comprises an annular conduit seal (17) mounted on the piston so that said annular conduit seal (17) tightly contacts the outer surface of said conduit tube (24) to provide a fluid tight seal between said piston (5) and said conduit tube (24);
    wherein said shear seal (13) has an aperture passing therethrough into which said conduit tube (24) is fixedly attached by a fluid tight seal to the outer surface of said conduit tube (24) within said circumferential tube wall recess (15) of said conduit tube (24), said shear seal member (13) having a conduit circumferential notch (22) located proximate to an inner periphery of the aperture in said shear seal member (13), the conduit circumferential notch (22) reducing the thickness of said shear seal member (13) so that when said piston (5) is pressurized said shear seal member (13) ruptures along said conduit circumferential notch (22); and further comprising:
    an annular tube seal (17) mounted to said piston (5) within the aperture passing through said piston (5) so that said annular tube seal (17) tightly contacts the outer surface of said conduit tube (24) to provide a fluid tight seal between said piston (5) and said conduit tube (24).

13. The cylindrical tank of claim 12, wherein said piston (5) has a circumferential conduit shoulder (23) positioned proximate to said shear seal member (13) and between said shear seal member (13) and said annular tube seal (17), said piston shoulder (23) extending to approach the outer surface of said conduit tube (24).

14. The cylindrical tank of claim 13, wherein said piston shoulder (23) is wedge shaped.

15. The cylindrical tank of claim 13, wherein an end of said piston (5) proximate to said shear seal member (13) is tapered.

16. The cylindrical tank of claim 12, wherein said shear seal (13) is fixedly attached to said piston (5).

17. The cylindrical tank of claim 12, wherein said shear seal member (13) is attached to said cylindrical body (2) and said conduit tube (24) by welds.

18. The cylindrical tank of claim 12, wherein a central portion of said shear seal member (13) has the same shape as a central portion of a surface of said piston (5) adjacent to said shear seal member (13).

19. The cylindrical tank of claim 18, wherein the central portion of said shear seal member (13) and the central portion of said piston (5) are substantially elliptical.

20. The cylindrical tank of claim 12, wherein said shear seal member (13) has a circumferential shoulder (21) in which said circumferential notch is located and a circumferential tube shoulder (21) in which said conduit circumferential notch (22) is located.

* * * * *